No. 639,782.  
B. C. SMITH.  
CULTIVATOR.  
(Application filed Sept. 26, 1898.)  
Patented Dec. 26, 1899.
(No Model.) 3 Sheets—Sheet 1.
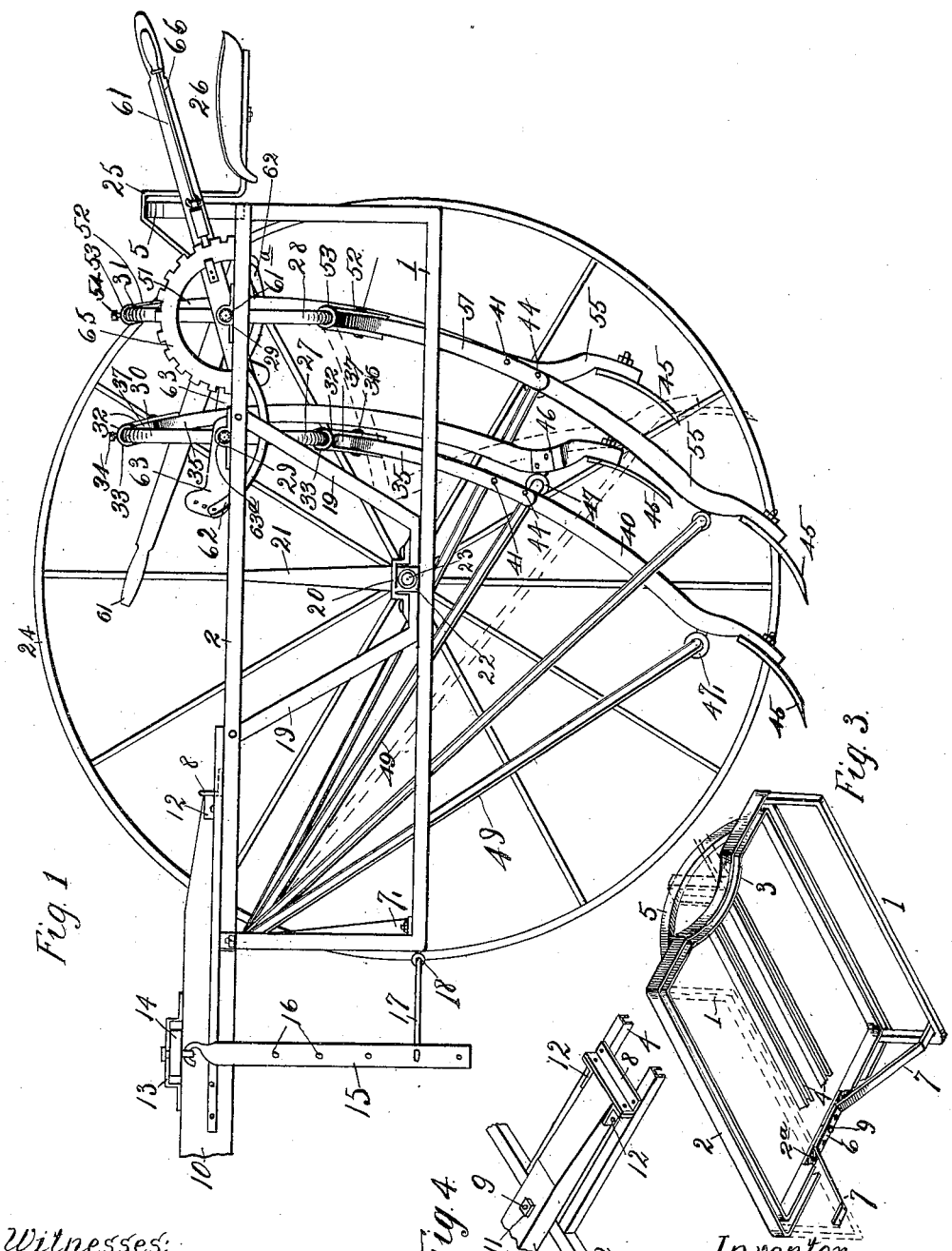
Witnesses:
C. F. Bartholomew
M. R. Remley
Inventor
B. C. Smith
By Higdon Fischer Thorpe
Attys.

No. 639,782. Patented Dec. 26, 1899.
B. C. SMITH.
CULTIVATOR.
(Application filed Sept. 26, 1898.)
(No Model.) 3 Sheets—Sheet 2.
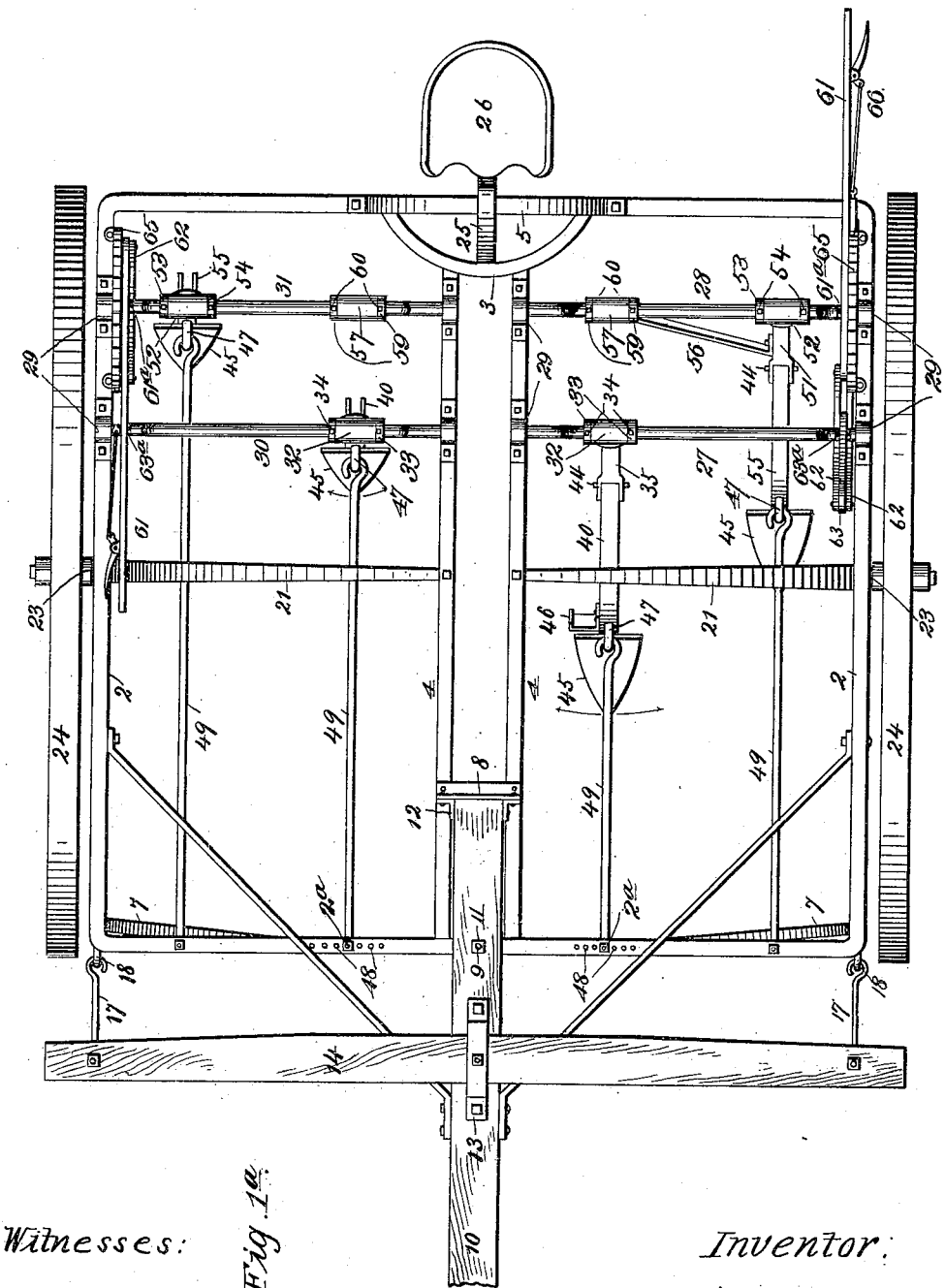
Fig. 1ª
Witnesses:
M. R. Remley
H. C. Rodgers
Inventor:
Benj. C. Smith
By Higdon, Fischer & Thorpe
Attys.

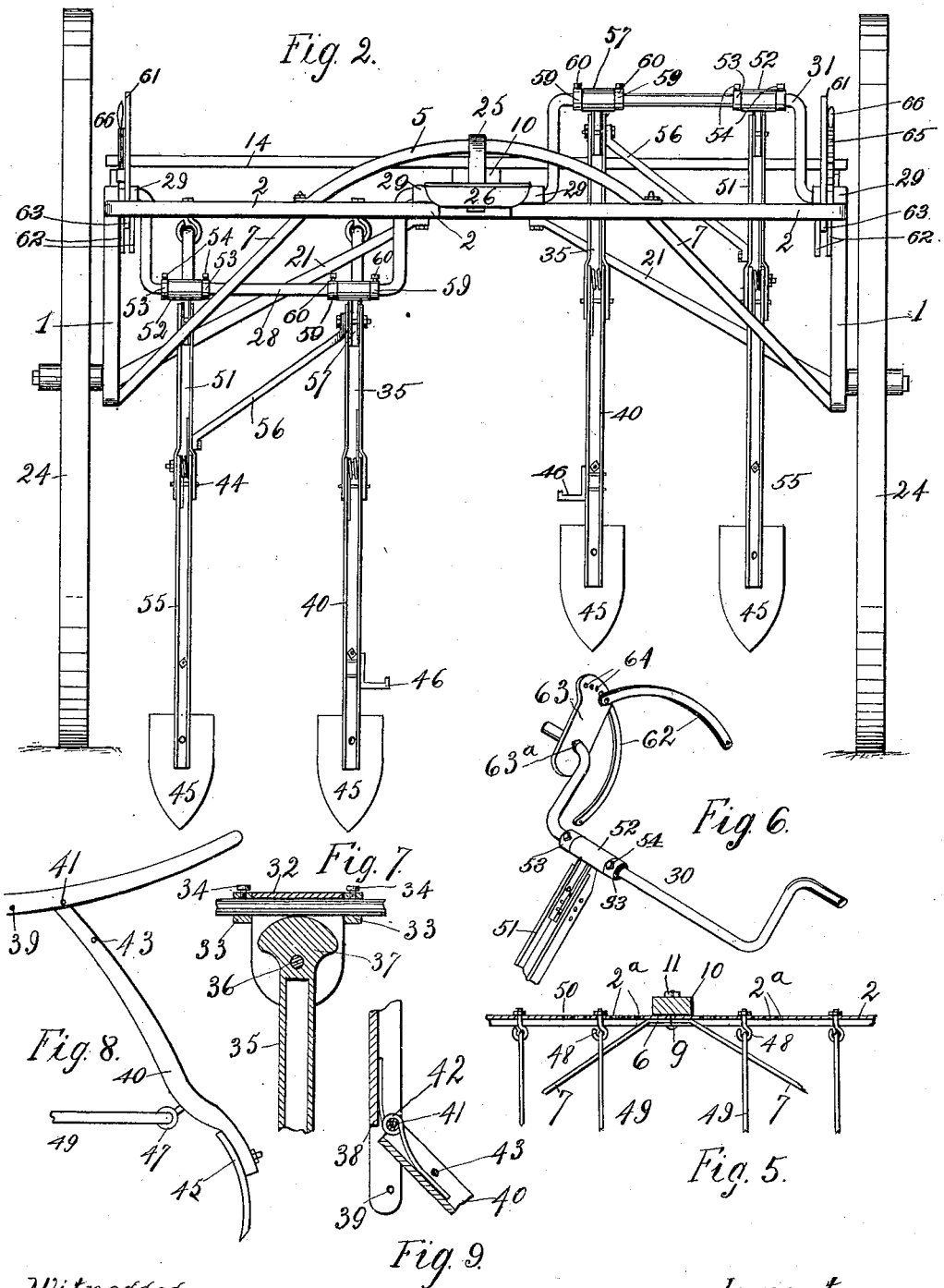

UNITED STATES PATENT OFFICE.

BENJAMIN C. SMITH, OF KANSAS CITY, KANSAS.

CULTIVATOR.

SPECIFICATION forming part of Letters Patent No. 639,782, dated December 26, 1899.

Application filed September 26, 1898. Serial No. 691,849. (No model.)

*To all whom it may concern:*

Be it known that I, BENJAMIN C. SMITH, a citizen of the United States, residing at Kansas City, Wyandotte county, Kansas, have invented certain new and useful Improvements in Cultivators, of which the following is a specification.

My invention relates to cultivators; and it consists in certain novel and peculiar features of construction and combinations of parts, as will be hereinafter described and claimed.

The objects of the invention are to produce a cultivator which is under perfect control of the driver and which can be adjusted to accommodate rows of varying widths.

A further object is to produce a cultivator provided with break-joint shovel-shanks in order that the shovels in striking a large stone or equivalent obstruction will yield and swing back out of the way without injury.

Other objects of the invention will hereinafter appear, and in order that it may be fully understood reference is to be had to the accompanying drawings, in which—

Figure 1 represents a side elevation of a cultivator embodying my invention, the near wheel of the cultivator being omitted. Fig. 1ª is a top plan view of the cultivator. Fig. 2 is a rear view of the same. Fig. 3 is a perspective view, on a smaller scale, of certain parts of the framework. Fig. 4 is a perspective view showing the tongue-securing devices. Fig. 5 is a vertical transverse section showing the connection with the frame of the shovel tie-rods. Fig. 6 is a perspective view of one of the shovel-carrying shafts and connected parts. Fig. 7 is a sectional view showing the adjustable connection between a front shovel-shank and its shaft. Fig. 8 is a side view showing one of the shovel-shanks in an inoperative position. Fig. 9 is a sectional view of part of said figure.

The framework of the entire machine is preferably constructed of channel and angle iron in order to obtain the required stiffness and strength without undue weight.

In the said drawings, 1 designates a pair of parallel longitudinally-arranged U-shaped frames, and 2 a rectangular frame secured in any suitable manner upon the upper ends of said frames 1. The frame 2 is preferably in the form of a single channel-iron bent to rectangular form and bent at its rear end, so as to provide the forwardly-projecting arc 3, and said arc is connected by the longitudinal irons 4 with the front side of the frame in any suitable manner.

5 designates a vertical arch which spans the recess at the rear end of the frame (see Fig. 3) and is adapted to support the seat, as hereinafter explained.

The meeting ends of the channel-iron forming frame 2 are connected by the bridge-bar 6, and said bar is provided with the downwardly-diverging brace-arms 7, bolted or riveted to the front ends of frames 1.

8 designates an angle-plate, connecting longitudinal irons 4 near their front ends, and 9 a vertical bolt uniting the bridge-bar 6 to frame 2 and also extending up through the forwardly-projecting tongue 10, a retaining-nut 11 engaging the upper end of the bolt. The rear end of the tongue bears against plate 8 and is reliably connected thereto by means of the angle-brackets 12.

13 designates the usual clip on the tongue, and 14 a doubletree pivoted therein.

15 designates pivotally-pendent bars from the doubletree 14, provided with a vertical series of holes 16 and linked near its lower end by links 17 to eyebolts 18, secured to the front ends of frames 1.

The singletrees (not shown) are adapted for connection with one or another of the holes 16 in order that the direction of pull by the animals may be varied to accommodate the weight of the driver upon the seat. If one driver happens to be heavier than another, the singletrees will be adjusted higher upon the bars 15, and vice versa, as will be readily understood.

19 designates downwardly-converging angle-braces connecting each frame 1 with the superposed part of frame 2, the adjacent ends of said braces being a slight distance apart, for a purpose which will hereinafter appear.

20 designates a pair of inverted-U-shaped brackets which are secured to braces 19 and bridge the narrow spaces between their ends.

21 designates a pair of downwardly-diverging brace-bars, secured at their upper ends to the framework and terminating at their lower ends in squared stub-shafts 22, secured by brackets 20 between the adjacent ends of braces 19 and spindles 23, upon which are journaled the carrying-wheels 24.

25 designates an inverted approximately U shaped bracket, secured at its lower end in any suitable manner to the arc 3 of frame 2 and resting at its bridge portion upon the arc 5, and mounted upon the rear end of said bracket is the seat 26, the latter being so positioned that the driver's knees project into the recess formed by bending the rear end of frame 2 in to form the arc 3.

A pair of similar crank-shafts 27 28 are journaled in bearings 29, secured to the framework, the shaft 27 being in advance of shaft 28 and both located at the same side of the center of the frame and projecting radially in the same direction. 30 31 designate a similar pair of shafts journaled in similar bearings 29 at the opposite side of the framework and projecting in the opposite direction from shafts 27 28—that is, when shafts 27 28 depend vertically the shafts 30 31 project vertically upward. Shaft 30 is in longitudinal alinement with shaft 27, and shaft 31 is longitudinally alined with shaft 28.

32 designates clips or sleeves which are pivoted upon shafts 27 and 30 and may be adjusted laterally thereon, adjustable collars 33 upon said shafts being employed to secure said clips at any desired point of adjustment, said collars carrying the usual set-screw 34 to impinge upon the shaft. (See Figs. 1 and 7.)

35 designates a pair of upper shank members, constructed, preferably, of channel-iron and pivoted in the clip 32, as shown at 36, so as to swing laterally, said upper shank members being provided with segmental heads 37 for continuous engagement with said shafts irrespective of the position of said shank members. The shank members may swing back and forth or at right angles to their lateral movement, because of the pivotal connection of the clips 32 with the shaft, as will be readily understood. (See Figs. 1 and 7.)

The bridge-bars of said upper shank members terminate short of the lower ends of said members, as shown at 38, and below said shoulders 38 apertures are provided, as shown at 39. (See Fig. 9.)

The lower shank members 40 are pivoted, as shown at 41, to the upper members and have their upper ends arranged to impinge upon the shoulders 38 of the upper members when the latter and the lower members are longitudinally alined. This connection obviously limits the forward independent movement of the lower members, but leaves them free to swing rearward, as will be readily understood by reference particularly to Figs. 8 and 9. A spring 42 is coiled around each pivot-bolt 41 between said shank members and bearing forwardly against the latter opposes a yielding resistance to the independent movement of the lower members. (See Fig. 9.) The lower members are provided with holes 43, which in the operative position of the parts register with the holes 39 and receive breakable pins 44, preferably of wood, in order that in case of the forcible contact of a shovel (hereinafter referred to) with a large rock or stump its pin will break and permit the lower member to swing back upon its pivot 41 until the obstruction is passed. It then is automatically returned to its original position by the action of the spring 42, when the operator fits a similar pin 44 in the registering holes 39 43, and the machine is again ready for operation.

The lower members of the shanks are provided with the usual cultivating-shovels 45, and secured to the inner sides of the members adjacent to said shovels are stirrups 46, which receive the operator's feet, in order that he may by pushing laterally against the shanks swing them freely in a lateral direction, and thereby avoid obstructions and also avoid injuring plants growing somewhat out of line. This arrangement, it will be seen, gives the operator almost perfect control of the inner shovels, and the machine is adapted to cultivate rows of varying widths by adjusting the clips 32 bodily on their respective shafts, the collars 33 securing them at the desired point, as hereinbefore explained.

The lower members 40 of the shanks are provided, in a plane slightly above the stirrups 46, by preference, with eyebolts, 47 and pivotally connecting said eyebolts with eyebolts 48, carried by the front cross-bar of frame 2, are tie-rods 49. The eyebolts 48 are adjusted laterally in the holes 2$^a$ of said cross-bar to accommodate the lateral adjustment of the shanks in order that the pulling strain thereof shall be parallel with the line of draft at all times.

The upper shank members, 51, of the rear cultivating appliances are pivotally suspended from clips 52, journaled upon the crank-shafts 28 31, and said clips are held in position by means of collars 53, provided with set-screws 54, Figs. 1 and 2. The lower shank members, 55, of the rear cultivating appliances are pivotally connected to the upper members, as illustrated in Figs. 8 and 9 and described with respect to the inner cultivating appliances, the parts 38 41 42 and holes 39 and 43 being common in the construction of both sets of cultivating appliances, (see the parts last mentioned and their designation by the same reference-numbers in Fig. 1,) and said lower members, 55, of the rear or outer shanks are also provided at their lower ends with the customary cultivating-shovels 45. The cultivating-shovels of the rear shafts are positioned permanently outward of the cultivating appliances first described and are adapted to be pivotally operated back and forth upon said shafts. To hold them against lateral movement, however, and to stiffen and strengthen them, I employ the oblique brace-bars 56, said brace-bars being secured at their lower ends to the upper shank members of the said outer cultivating appliances and at their upper ends to clips 57, journaled upon shafts 28 and 31, and secured against lateral movement by means of collars 59 and set-screws 60. (See Fig. 2.) These rear or outer shanks, as will be understood from the foregoing description, are provided with breakable pins 44 for the purpose hereinbefore explained and act in all respects like the inner cultivating appliances, except that the former are also adapted to swing laterally and be bodily adjusted in a lateral direction to increase or diminish the space between them.

Referring now to the features of construction by which the shafts 27 28 and 30 31, respectively, are manipulated, 61 designates levers which are keyed or mounted non-rotatably upon the squared surfaces 61ᵃ of rear shafts 28 and 31, respectively, and 62 curved links which extend forward from said levers and are connected pivotally to arms 63, mounted upon squared portions 63ᵃ of shafts 27 and 30, respectively, the arm 63 of shaft 27 projecting forward normally and the arm 63 of shaft 30 projecting rearward normally. Thus it will be seen that the operation of the lever 61, mounted on shaft 28, will cause the simultaneous operation of said shaft and the shaft 27, connected thereto by the arm 63 and links 62, without affecting the position of the shafts 30 31 at the opposite side of the framework and that the simultaneous operation of shafts 30 31 by the other lever does not affect the position of the first-named pair of shafts. These arms 63 are provided with a series of holes 64 in order that the pivotal point of connection between links 62 and said arms may be varied, the adjustment of said links on said arms effecting in practice a variation in the depth to which the front plows can be depressed, as will be readily understood. To lock these levers, and consequently the shafts, at the desired point of adjustment, sectors 65 are secured to the framework, and engaging said sectors are the usual locking devices 66, such devices being of any preferred type.

The variable connection between the arms 63 of the front shafts and the links 62 of the levers, as hereinbefore stated, admits of plowing with the front cultivating appliances to a greater depth, as is necessary when plowing listed corn.

In going to or returning from the field or in passing an obstruction, such as a very large rock or a stump, the driver grasps and operates one or both of the levers 61 and swings all of the shafts to the elevated position occupied by shafts 30 and 31 in the drawings, and thereby elevates the shovels to a height sufficient to clear ordinary obstructions. The cultivating appliances are lowered by simply reversing this action, and in both movements the tie-rods simply swing upon the eyebolts 48.

In case a shovel strikes an obstruction with sufficient force its pin 44 will break. Under this application of power or resistance the spring 42 will instantly yield, and as the power is applied upon the shovel below the pivotal point of connection between the shank and the tie-rod 49 the former swings forward on its pivot and is of course accompanied in such movement by the upper member, the tie-rod 49 swinging upward at the same time. The dotted lines, Fig. 1, illustrate approximately a position which the parts may assume in such operation; but if the obstruction be unusually large this collapsing operation of the parts may continue until the tie-rod swings sufficiently high for the upper portion of the lower member to fold almost flatly against it. In this case it will be obvious that the upper and lower members of the shank and the tie-rod extend almost in parallel planes. When the obstruction is passed, the parts by force of gravity resume their original positions, and, as above stated, a new pin 44 is secured in place to lock the shank members in their operative positions.

As the operation of the various parts has been described in detail, it is thought a recapitulation will be unnecessary.

From the above description it will be apparent that I have produced a cultivator which possesses the features of advantage enumerated in the statement of invention, and it is to be understood that I reserve the right to make all changes that properly fall within its spirit and scope.

Having thus described the invention, what I claim as new, and desire to secure by Letters Patent, is—

1. A cultivator, comprising a wheeled frame, a crank-shaft journaled thereon and means to raise and lower the same, cultivating appliances suspended from the crank-shaft, comprising a shank pivoted at its upper end to the shaft, consisting of two members pivoted together at their meeting ends and held yieldingly in longitudinal alinement, and a shovel secured to the lower end of the lower member, and a tie-rod pivotally connected at its front end to the framework and at its rear end to the shank, substantially as described.

2. A cultivator, comprising a wheeled frame, a crank-shaft journaled therein and means to raise and lower the same, laterally-adjustable cultivating appliances pivotally suspended from said shaft, and comprising a shank and a shovel, and a tie-rod pivotally connecting said shank and the framework and laterally adjustable at its front end, substantially as described.

3. A cultivator, comprising a wheeled framework, a crank-shaft journaled therein and means to raise and lower the same, a laterally-adjustable clip pivoted upon the shaft, cultivating appliances consisting of a shovel and a shank therefor, the latter being pivoted in said clip to swing transversely of the line of draft, and provided with foot-stirrups, and a tie-rod pivotally connecting the shanks with the framework, substantially as described.

4. In a cultivator, a suitable framework, a crank-shaft, and means for raising and lowering the same, cultivating appliances pivotally suspended from said shaft to swing parallel with the line of draft, and consisting of an upper shank member having a shoulder, a lower shank member provided with a shovel and pivoted to the upper member so as to engage said shoulder at times, a spring to hold said members in the position described, a breakable pin extending through said members to lock them in such position, and a tie-rod pivotally connecting the lower member with the framework, substantially as described.

5. In a cultivator, a suitable framework, a crank-shaft, and means for raising and lowering the same, cultivating appliances pivotally suspended from said shaft to swing parallel with the line of draft, and consisting of an upper shank member having a shoulder, and pivoted at its upper end to swing transversely of the line of draft, a lower shank member provided with a shovel and pivoted to the upper member so as to engage said shoulder at times, a spring to hold said members in the position described, a breakable pin extending through said members to lock them in such position, and a tie-rod pivotally connecting the lower members with the framework, substantially as described.

In testimony whereof I affix my signature in the presence of two witnesses.

BENJAMIN C. SMITH.

Witnesses:
  M. R. REMLEY,
  F. S. THRASHER.